United States Patent [19]

Boonen et al.

[11] Patent Number: 5,515,778
[45] Date of Patent: May 14, 1996

[54] METHOD AND A DEVICE FOR PRINTING DISC-SHAPED REGISTRATION CARRIERS

[75] Inventors: Antonius H. M. Boonen, RL Geldrop; Peter F. A. Horsten, XM Valkenswaard; Henricus T. L. P. Stockx, CB Someren-Eind, all of Netherlands

[73] Assignee: ODME International B.V., Eindhoven, Netherlands

[21] Appl. No.: 326,287

[22] Filed: Oct. 20, 1994

[30] Foreign Application Priority Data

Oct. 26, 1993 [NL] Netherlands ............... 9301846

[51] Int. Cl.⁶ ............... B41F 17/00; B41M 1/20
[52] U.S. Cl. ............... 101/35; 101/151; 101/170; 101/211; 101/251; 101/252; 101/126; 101/129; 101/492
[58] Field of Search ............... 101/35, 41–44, 101/150, 151, 158–162, 163, 170, 173, 186, 187, 211, 214, 215, 250–252, 269, 483, 492, 115, 126, 129

[56] References Cited

U.S. PATENT DOCUMENTS

| | | | |
|---|---|---|---|
| 4,109,572 | 8/1978 | Roulleau | 101/37 |
| 4,417,513 | 11/1983 | Milliman et al. | 101/158 |
| 5,188,034 | 2/1993 | Iaccino et al. | 101/126 |
| 5,232,505 | 8/1993 | Novak et al. | 118/50 |

FOREIGN PATENT DOCUMENTS

| | | | |
|---|---|---|---|
| 264787 | 4/1988 | European Pat. Off. | 101/186 |
| 574975 | 12/1993 | European Pat. Off. | |
| 75149 | 3/1991 | Japan | 101/35 |

*Primary Examiner*—Stephen Funk
*Attorney, Agent, or Firm*—Cushman Darby & Cushman

[57] ABSTRACT

A method and a device for printing disc-shaped registration carriers, whereby a print built up of several colors is provided on the registration carrier. Use is made of a printing cylinder, which is moved over a few printing plates, which have been moistened with various colors of ink, whereby the printing cylinder is subsequently rolled over the registration carrier. The device comprises a plurality of processing stations for registration carriers, as well as a transport device by which the disc-shaped registration carriers can be moved from one processing station to the other processing station. One or more processing stations comprise a printing device disposed therein.

13 Claims, 5 Drawing Sheets

METHOD AND A DEVICE FOR PRINTING DISC-SHAPED REGISTRATION CARRIERS

BACKGROUND OF THE INVENTION

The invention relates to a method for treating disc-shaped registration carriers, wherein said registration carriers are moved in steps in a predetermined path of movement along a plurality of processing stations, in each of which the registration carriers are subjected to a certain processing step.

The term registration carriers is understood to mean sound and/or picture carriers and/or data carriers and the like, for example so-called compact discs, as well as carriers which can be processed at a later stage in order for sound, pictures or other data to be registered to be recorded thereon.

A method of the above kind can be derived from prior Dutch Patent Application 9201065, whose contents are considered to be incorporated herein by this reference. As described in said patent application the registration carriers are thereby taken to various stations along a predetermined path, whereby a processing step is carried out in at least a number of said stations, such as for example the application of an amount of paint, the even spreading of the paint over the registration carrier surface, the curing and/or drying of the paint, the checking of the registration carrier, etc.

In many cases it is also desirable to provide a print on every registration carrier, which print may for example give information with regard to the sound and/or picture and/or information recorded on the registration carrier. To an increasing extent a multicolor print is being requested thereby.

From European Patent Application 0528106 a method is known for treating registration carriers, for printing said registration carriers, whereby the registration carriers are supplied to a rotary table, by means of which the registration carriers are moved past a few stations, in each of which a screen-printing machine is disposed, by means of which a print of a certain color is put on the registration carrier. This putting on of several colors in several steps is time-consuming and furthermore requires a specialized and voluminous arrangement, which is exclusively suitable for providing a color print.

From Patent Abstracts of Japan Vol. 13. No. 580(P980), 21st Dec. 1989, a device for printing optical discs can be derived. This device comprises a table which is rotatable about a vertical axis of rotation, to which table the optical discs are supplied in succession and by means of which the optical discs present on the rotary table are moved in steps. The device is provided with means for putting four differently colored inks on the optical discs. Said means are constructed in such a manner, that each color is put on the disc in question in a different station. It will be apparent that also this method is time-consuming and likewise requires a complicated construction of the device. In connection with the pursuit of a higher productivity short operating cycles are required, however, whereby it is preferred to use the simplest possible equipment, in order to be able to prevent failures and the concomitant loss of time as much as possible.

SUMMARY OF THE INVENTION

According to the invention a printing cylinder or roller is rolled over a registration carrier at present at a respective station, whereby the printing cylinder is moved to and fro through the station in question during operation, in a direction transverse to the path of movement of the registration carrier. The printing roller also moves over a few printing plates arranged one behind the other near the station, seen in the intended direction of movement of the printing cylinder, which printing plates are moistened with various colors of ink during operation.

When the method according to the invention is used, it is possible to provide an effective multicolor print on the registration carrier in a quick and simple manner in one operation, which can take place in a processing station readily placed in the path of movement along which a registration carrier is to be moved between various processing stations.

It is noted that printing devices provided with a printing cylinder capable of reciprocating motion, which is movable over several printing plates arranged one behind the other, seen in the intended direction of movement of the printing cylinder, have been known per se for many decades, as appears for example from U.S. Pat. 1,499,998. Nevertheless, no method according to the present invention is known from the prior art which makes it possible to provide a multicolor print in an effective and quick manner on registration carriers which are moved along a plurality of successive processing stations without interfering with the smooth progress of said registration carriers thereby.

Preferably the registration carrier is provided with a coating over at least part of its surface area prior to the provision of the multicolor print. The application of such a coating makes it possible to obtain an improved multicolor print, because the multicolor print only consists of a thin layer of ink. When no coating is applied, the registration carrier material located under the print may have a harmful effect on the appearance of the print.

Consequently, a further aspect of the invention relates to a device for carrying out the above-described method for printing disc-shaped registration carriers, said device being provided with a plurality of processing stations comprising support means for supporting said registration carriers in said processing stations, and with transport means by which said disc-shaped registration carriers can be moved from one processing station to the other processing station along a conveying path.

A device of this type is described in prior Dutch Patent Application 9201065.

According to the invention the device is provided with a printing device disposed near a processing station, said printing device comprising a printing cylinder, which is reciprocatingly movable in a direction transverse to the conveying path, in order to transfer a print image from a few printing plates to a disc-shaped registration carrier present in the respective processing station, while a few inking rollers coupled with the printing cylinder can be moved to and fro along with the printing cylinder between an inking unit and the respective printing plates.

When using the device according to the invention a multicolor print can be provided on a registration carrier in a single processing station. Due to the fact that it is possible to put on several colors in a single processing station of the device, the device can be used optimally, since the other processing stations are available for other operations on the disc-shaped registration carriers, or be fitted with fewer processing stations, while in addition to that the complete processing of the registration carriers can be effected in the device in a comparatively short time.

BRIEF DESCRIPTION OF THE DRAWINGS

The invention will be explained in more detail hereafter with reference to a possible embodiment of a device according to the invention to be used in carrying out the method according to the invention, which is diagrammatically illustrated in the accompanying FIGS.

DESCRIPTION OF THE PREFERRED EMBODIMENTS

Figure 1:
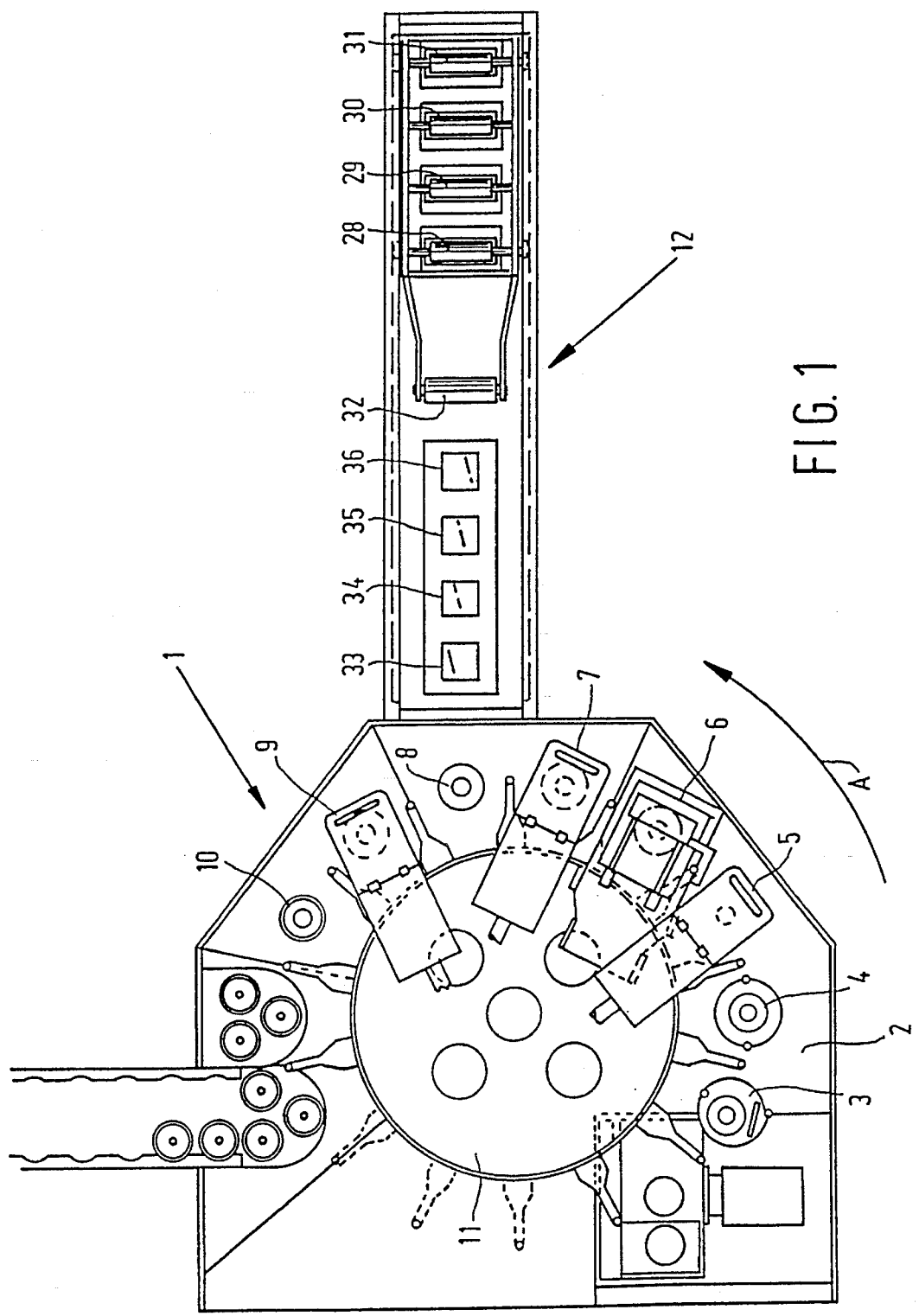
FIG. 1 is a diagrammatic plan view of a device for processing disc-shaped registration carriers and a printing device coupled therewith.

As is described in prior Dutch Patent Application 9201065 the device 1 for processing disc-shaped registration carriers comprises a frame 2, which serves to support a number of stations 3–10, in which, as explained in Patent Application 9201065, certain desired operations on the disc-shaped registration carriers may take place. The registration carriers are thereby moved from one station to the other along a circular conveying path in the direction according to arrow A by transport means 11, which is capable of reciprocating pivotal motion about a vertical axis of rotation.

For the sake of brevity reference is made to Dutch Patent Application 9201065 for a description of the construction and operation of this device, since the construction of the device 1 is not of great significance for the present invention.

A printing unit (not shown), such as for example a screen-printing device or a stippling device, is disposed in station 6. Said printing device may be used to apply a coating to the registration carrier, which coating may extend over the entire registration carrier or over a desired part of the registration carrier. Generally a white coating will be applied although also other colors are conceivable. By applying such a coating it can be prevented that the multicolor print image to be put on in a manner yet to be described hereafter is disturbed by interference patterns from light through the underlying information patterns on the registration carrier.

In station 7 the coating applied in station 6 may be dried, for example by means of a UV-light source.

A further printing device 12 is disposed near station 8.

As is furthermore apparent from FIGS. 2–5, the printing device comprises a frame 13, said frame in the illustrated embodiment supporting four diagrammatically indicated inking units 14–17, which are arranged in side-by-side relationship.

Each inking unit may, for example, comprise an ink reservoir 18, in which an ink absorbing roller 19, which is rotatable about a horizontal axis of rotation, is partially submerged. The ink can be transferred from the roller 19 to an ink transport roller 22 arranged near the upper side of the respective unit via a few intermediate rollers 20 and 21. The construction of the inking units themselves is not of significance for the invention, other embodiments are conceivable.

The printing device is furthermore provided with a slide 23, which can be moved reciprocatingly within the frame 13 by driving means (not shown), as indicated by means of arrow B. The slide is thereby supported in the frame at one end by means of guide rollers 24 provided on either side of the slide, which guide rollers are positioned within guiding grooves 25 provided in the frame.

Near the other end of the slide guide rollers 26, which are positioned lower than the guide rollers 24, are provided on either side of the slide. Said guide rollers 26 are positioned within guiding grooves 27 formed in the frame.

Figure 3:
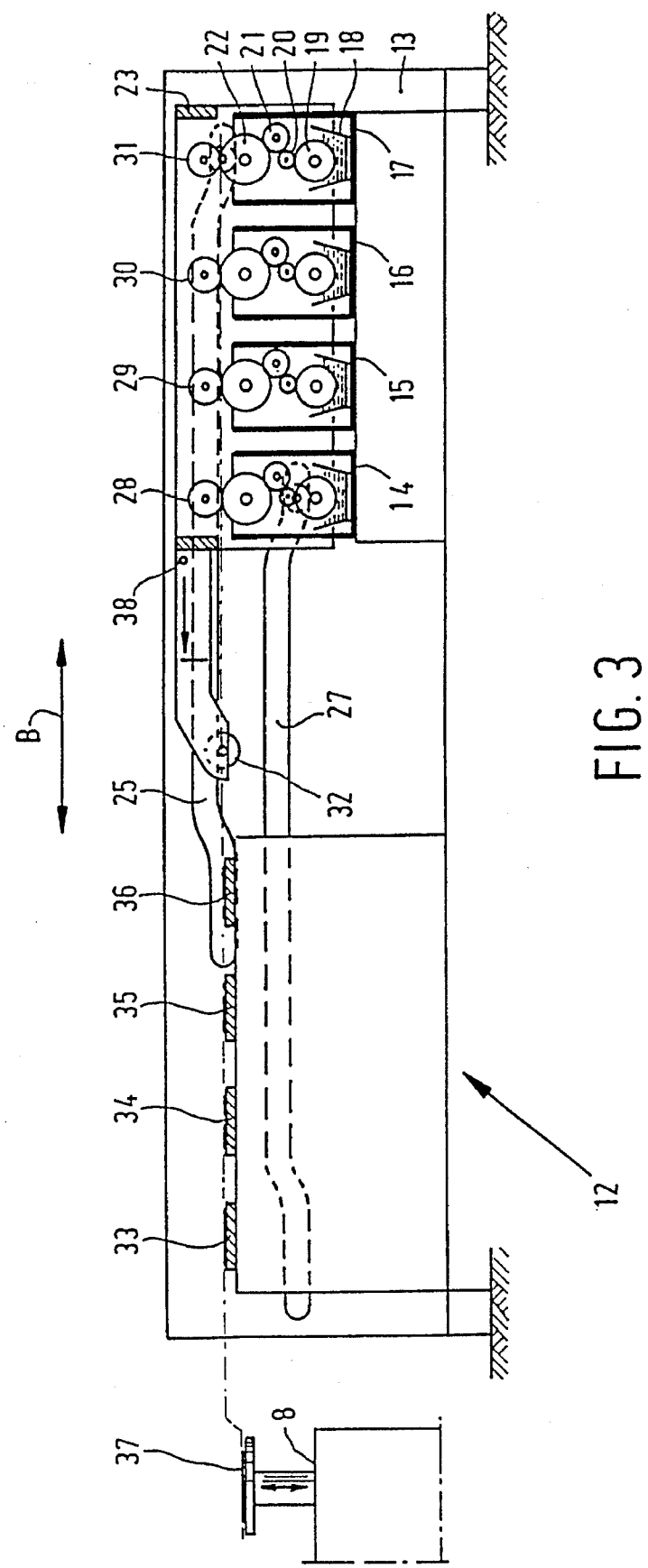
FIGS. 3–5 are diagrammatic sectional views of the printing device in various operating positions, along the line III—III in FIG. 2.

As will furthermore be apparent from FIG. 3, the horizontally extending ends of the guiding grooves 25 are positioned lower than the horizontally extending central portions of the guiding grooves 25.

The guiding grooves 27 are similarly shaped, but the guiding grooves 27 are moved to the left with respect to the guiding grooves 25, seen in FIG. 3.

Four inking rollers 28–31 extending parallel to each other in horizontal direction are provided in the slide 23, said rollers in the position shown in FIG. 3 being in contact with the ink transport rollers 22.

Furthermore a printing cylinder 32 being rotatable about a horizontal axis is mounted on one end of the slide.

Four readily and quickly exchangeable printing plates 33–36 supported by the frame are arranged on the left of the printing cylinder, seen in FIG. 3, each of which printing plates will contain a different print image.

Figure 2:
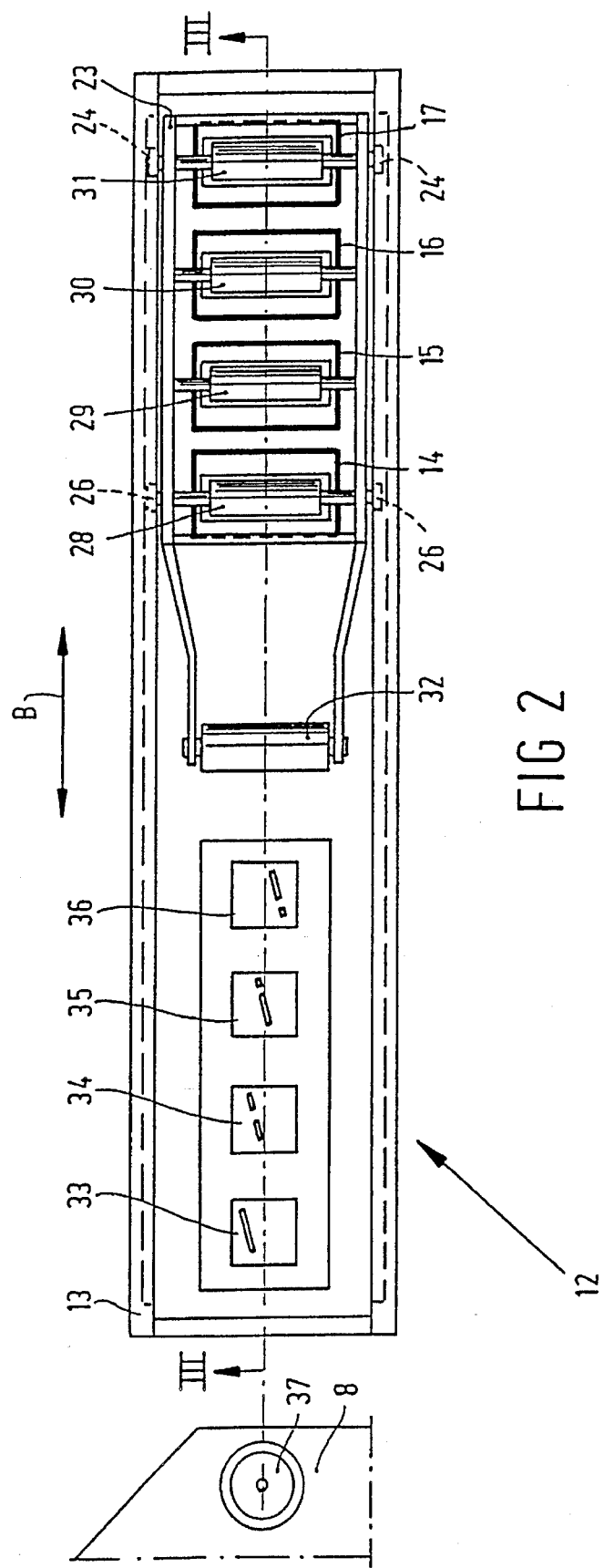
FIG. 2 is a larger-scale diagrammatic plan view of the printing device.

It will be apparent in particular from FIG. 2 that the arrangement is thereby such that the inking units 14–17, the inking rollers 28–31 and the printing plates 33–36 will be arranged one behind the other, seen in the direction of movement according to arrow B, in line with a registration carrier 37 present in station 8 of the device 1.

The various rollers of the inking units may be rotated by driving means (not shown) in order to transfer ink from the ink reservoir to the inking rollers. Generally the ink reservoirs will each contain an ink of a different color.

Figure 4:
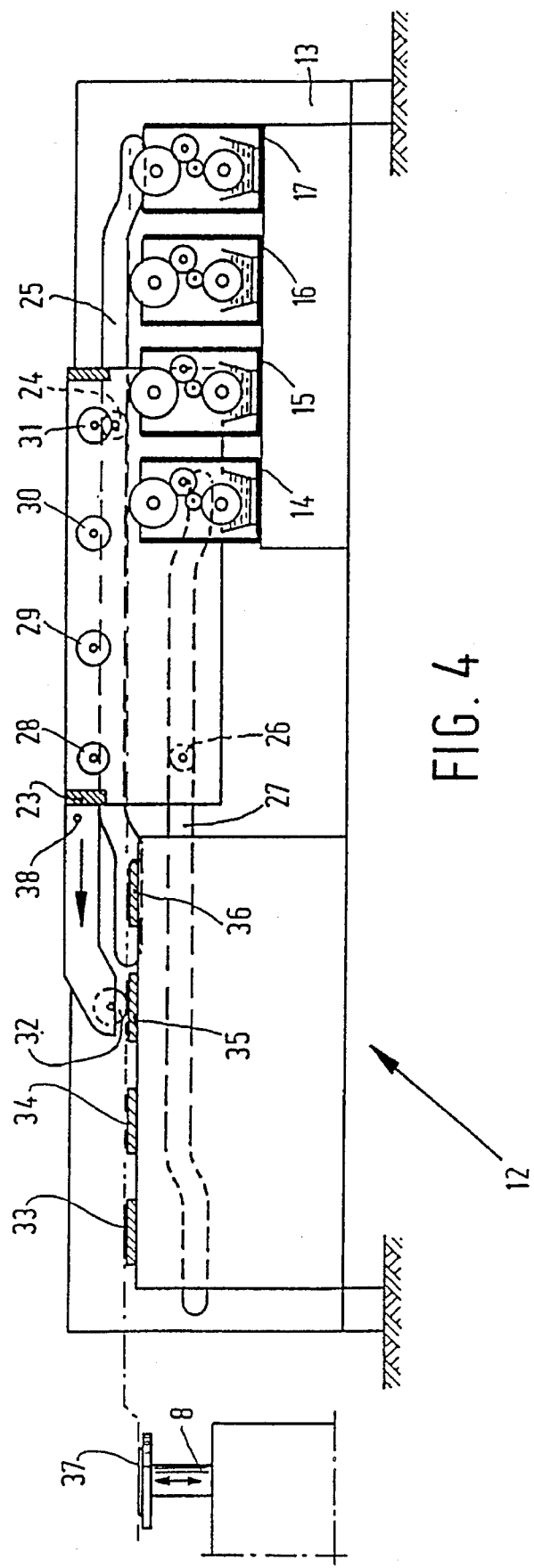
Figure 5:
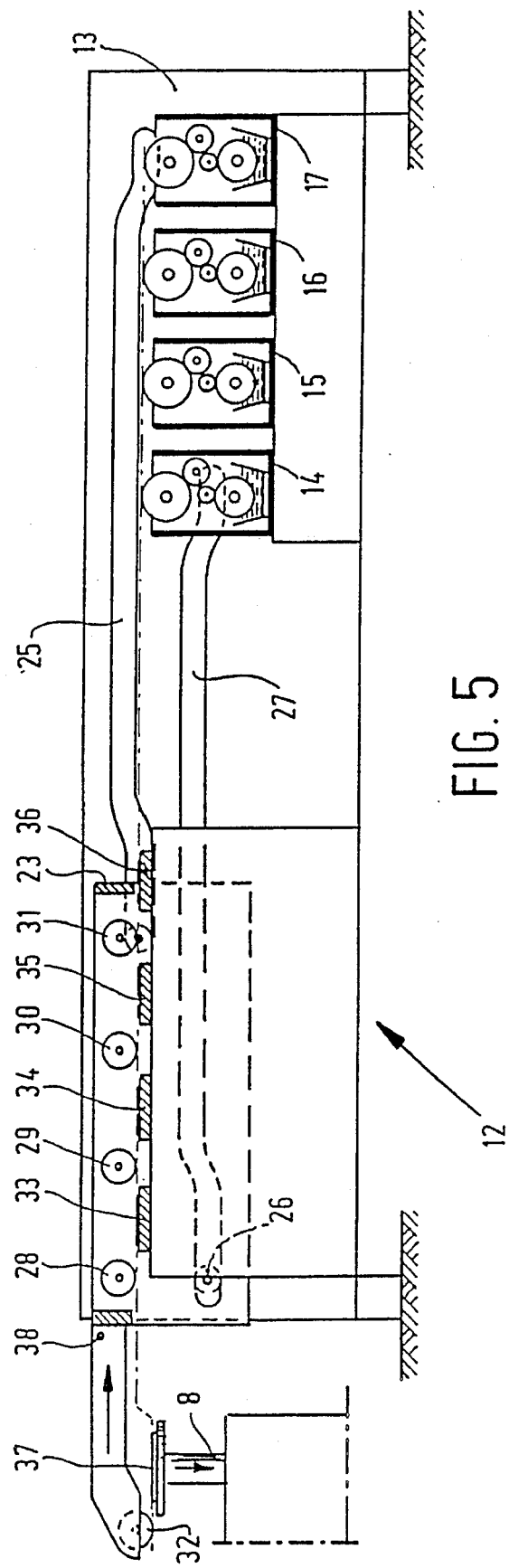

In order to print the registration carrier 37 present in the station slide 23 will be moved from the position shown in FIG. 3, via the position shown in FIG. 4, to the final position illustrated in FIG. 5.

At the start of this movement the guide rollers 24 and 26 will thereby move out of the low-lying starting ends of the guiding grooves 25 and 27 towards the higher central parts of said grooves 25 and 27, so that the slide, together with the inking rollers 28–31 supported by the slide, and the printing roller 32 will be moved slightly upwards.

When the slide is moved further to the left, seen in FIGS. 2–5, the printing roller 32 will successively move over the printing plates 36, 35, 34 and 33 and take over the respective print image from said printing plates.

During the last part of the movement towards the left the guide rollers 24 and 26 will move from the central parts of the guiding grooves 25 and 27 to the lower left-hand ends of said guiding grooves, so that the slide 23 and the rollers supported by said slide will move downwards, in such a manner that the printing roller 32 will roll off onto the registration carrier 37 present in the station 8 at the end of the movement towards the left, in order to print the print images taken over from the printing plates by the printing roller on the registration carrier.

At the point where the slide 23 starts to move downwards near the end of its movement towards the left, seen in FIGS. 2–4, the inking roller 28 is positioned between the printing plates 33 and 34, the inking roller 29 is positioned between the printing plates 34 and 35, inking roller 30 is positioned between the printing plates 35 and 36 while inking roller 31 is positioned just to the right of the printing plate 36, seen in FIGS. 3–5. As a result each inking roller will roll over a respective printing plate during the last part of the stroke towards the left of the slide 23, in order to transfer the ink to the printing plate.

Once the stroke of the slide towards the left has been completed, the direction of movement of the slide 23 will be reversed and the above-described movement will take place in reverse direction.

The printing roller 32 will thereby be pivoted upwards with respect to the slide 23, about a pivot pin 38 extending parallel to the printing roller 32. This prevents the printing roller 32 from coming into contact with the printing plates 33–36 during the return stroke of the slide.

When the above-described printing device is used in the device for processing disc-shaped registration carriers, it is possible to effect a quick and effective printing of the registration carriers in several colors, if desired. In the illustrated embodiment a four-color print can be provided on the registration carrier when use is made of the four inking units shown in the FIG. It will be apparent, however, that it is also possible to use more or fewer colors, dependent on the type of print that is desired.

The multicolor printing of the registration carrier can thereby take place in one operation in one station of the device 1, without this resulting in a slower operation of the device, that is, of the processing steps in the other stations.

Not only does the application of a coating in station 6 as described above provide a print image having an extra color, it also provides a substrate for the multicolor print which has been put on in station 8, which substrate may or may not extend over the entire surface area of the registration carrier or the multicolor print, as the case may be, as a result of which an optimum result can be effected with regard to the print desired.

Preferably the printing plates as well as the inking units are thereby mounted in the printing device in such manner as to be readily exchangeable, so that colors can be quickly changed, if desired.

Of course additions and/or variations to the embodiment as described and illustrated above are conceivable within the spirit and scope of the invention.

Thus the inking rollers 28–31 may for example be journalled independently of each other in vertical direction in the slide 23, and be guided with suitable guide rollers and guiding grooves in such a manner that they only come into contact with a desired printing plate or ink tranport roller 22 in predetermined places and are further moved along without touching the other printing plates and/or ink transport rollers 22.

In order to be able to ensure a satisfactory application of ink to the printing plates it may furthermore be desirable to provide two inking rollers for inking each printing plate rather than one, as is the case in the embodiment described and illustrated above.

Instead of applying a white coating it is also possible to provide an illustration, a text or the like by means of a suitable printing device in station 6, which is also covered by the term coating within the spirit of this invention, particularly in the claims.

We claim:

1. A method for treating disc-shaped registration carriers comprising the steps of moving the registration carriers in steps in a predetermined path of movement along a plurality of processing stations in each of which the registration carriers are subjected to a processing step, rolling a printing cylinder over a surface of a registration carrier present at one of the stations so that the printing cylinder is moved to and fro through the station during operation, in a direction transverse to the path of movement of the registration carrier, moving the print cylinder over a series of printing plates arranged one behind the other near the station in the intended direction of movement of the printing cylinder to apply a multicolor print to the surface of the registration carrier, and moistening the printing plates with various colors of ink by a series of inking rollers as the print cylinder rolls over the registration carrier.

2. A method according to claim 1 including applying a coating to the registration carrier over at least part of its surface area prior to applying the multicolor print to the coated surface.

3. A method according to claim 2 wherein a white coating is applied.

4. A method according to claim 2 including the step of drying the coating prior to applying the multicolor print.

5. A method according to claim 1 including the additional steps of mounting successive registration carriers along the conveying path and printing each of the successive registration carriers.

6. A method according to claim 5 wherein at least a portion of the surface of the registration carrier has been pre-coated.

7. A registration carrier coating device comprising a plurality of processing stations, each including support means for supporting a disc-shaped registration carrier therein, transport means for moving the disc-shaped registration carriers from one processing station to other of said plurality of processing stations along a conveying path, a printing device disposed near one of said plurality of processing stations, said printing device comprising a series of printing plates arranged one behind the other in a direction transverse to said conveying path and a single printing cylinder which is reciprocatingly movable in the direction transverse to said conveying path to pass successively over each of said printing plates and said disc-shaped registration carrier so that a print image comprising several colors can be transferred from said series of printing plates to the disc-shaped registration carrier supported in said one processing station and within said conveying path, a plurality of inking units arranged one behind the other in a direction transverse to said conveying path and positioned outwardly from said series of printing plates, relative to the registration carrier, and a plurality of inking rollers coupled with said printing cylinder for movement therewith between said plurality of inking units and said series of printing plates.

8. A device according to claim 7 wherein said printing cylinder and said inking rollers are journalled in a slide, said slide being movable between a first position, in which said inking rollers are in contact with said plurality of inking units and in which said printing plates are located between said printing cylinder and said one processing station in which a registration carrier to be printed is positioned, and a second position, in which said printing cylinder has been moved over a registration carrier present in said one processing station and in which said inking rollers have been moved over said printing plates.

9. A device according to claim 7 further including guide means for moving said inking rollers upwards and downwards so that during the reciprocating motion of said slide, a respective inking roller only comes in contact with one printing plate which is to be supplied with the ink carried by the respective inking roller.

10. A device according to claim 7 wherein the path of movement of said printing cylinder crosses said conveying path substantially perpendicularly, and said printing cylinder extends substantially tangentially with respect to said conveying path.

11. A device according to claim 7 further including means for allowing pivoting of said printing cylinder upwards on a return stroke so that when said printing cylinder is moved away from said one processing station containing a printed registration carrier, said printing cylinder is moved without coming into contact with the registration carrier and said printing plates.

12. A device according to claim 7 wherein one of said processing stations includes a device for applying a coating to the registration carrier prior to applying a multicolor print.

13. A device according to claim 12 further including a drying station for drying the prior coating positioned between said station applying the prior coating and said one processing station in which said printing device transfers a multicolor print.

* * * * *